Figure 1:
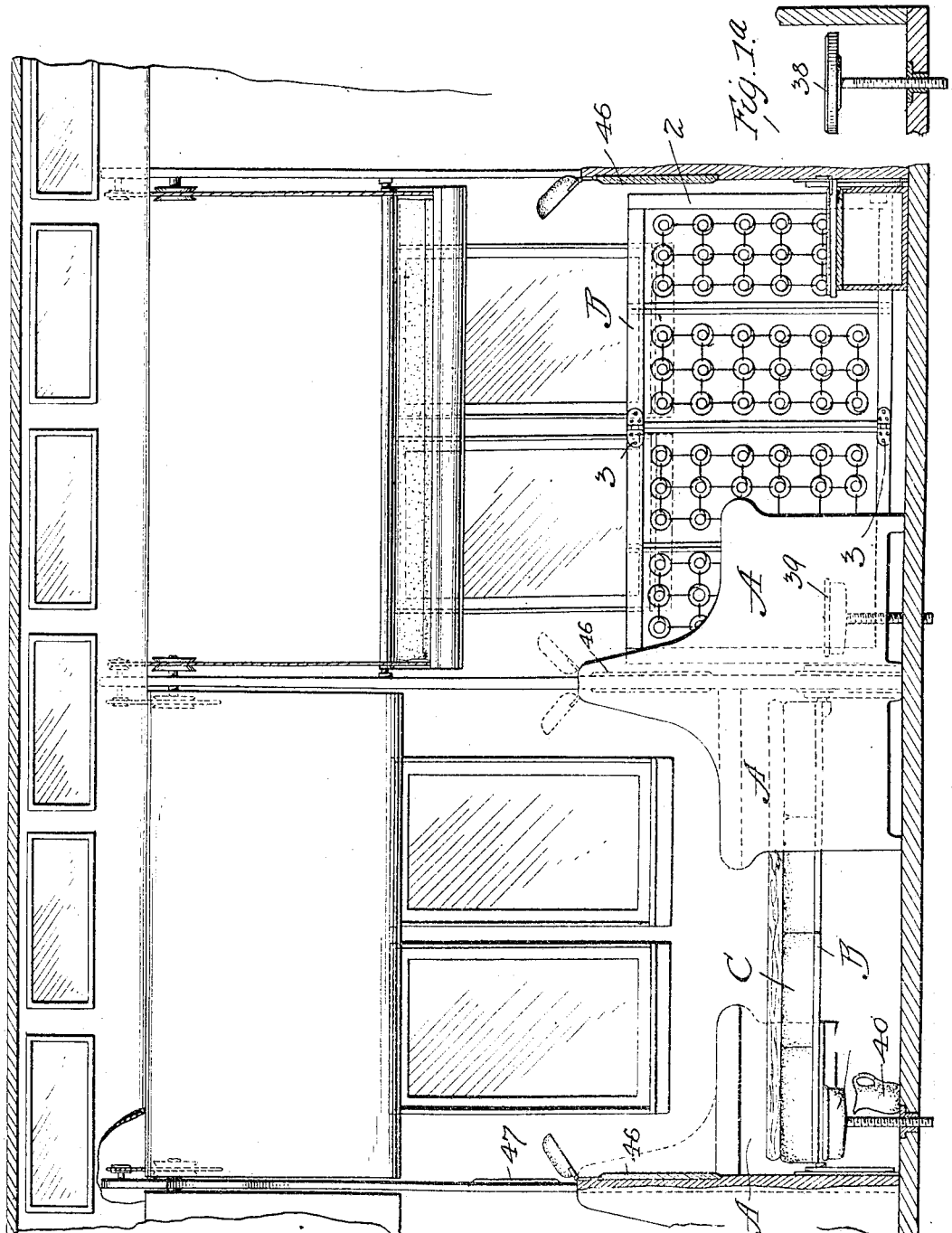

No. 819,196. PATENTED MAY 1, 1906.
T. O. ABBOTT.
SLEEPING CAR.
APPLICATION FILED JAN. 17, 1906.
5 SHEETS—SHEET 2.
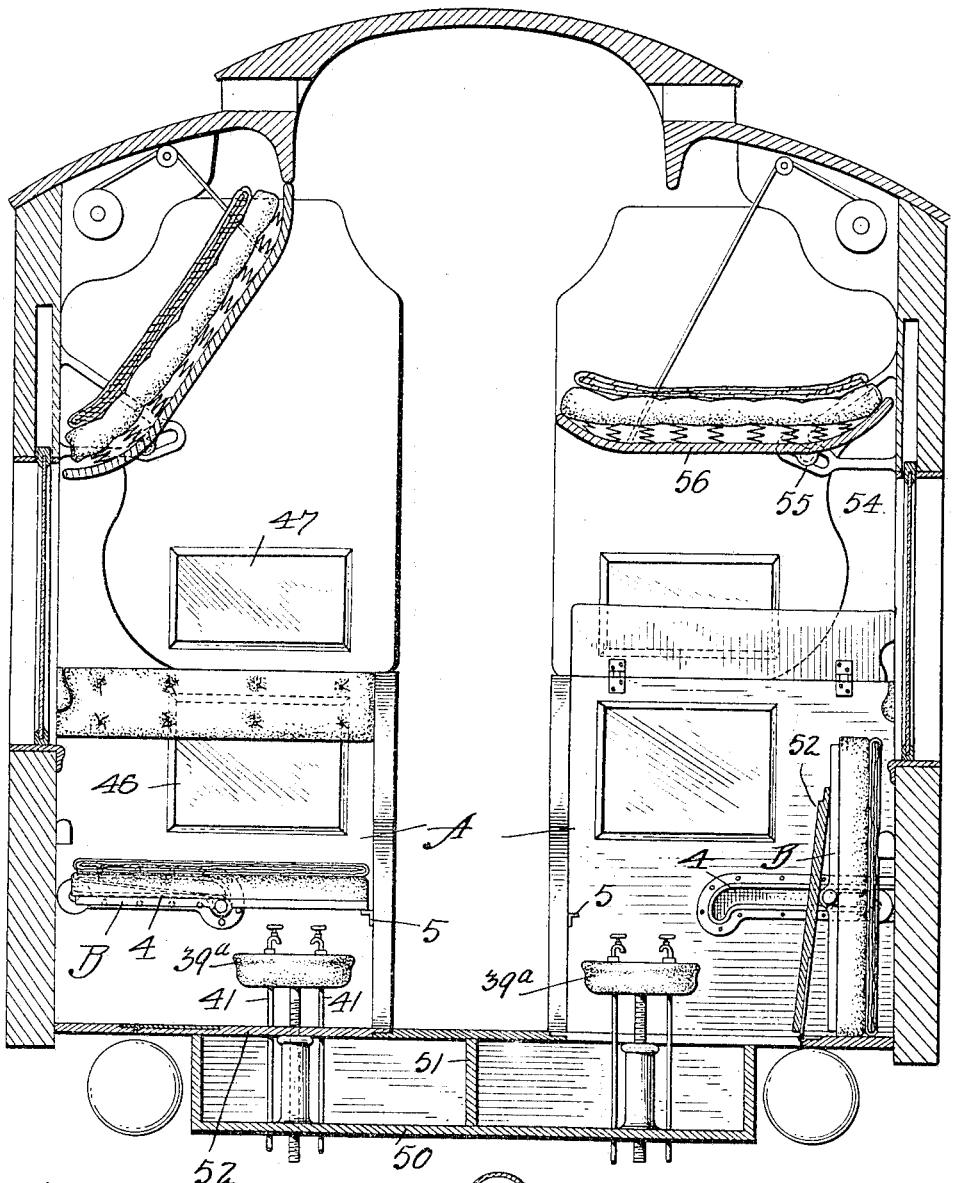
Fig. 2.
Fig. 2ª.
Attest:
C. S. Madion
Edward N. Saxton
Inventor
Twyman O. Abbott
By Spear, Middleton, Donaldson
Attys

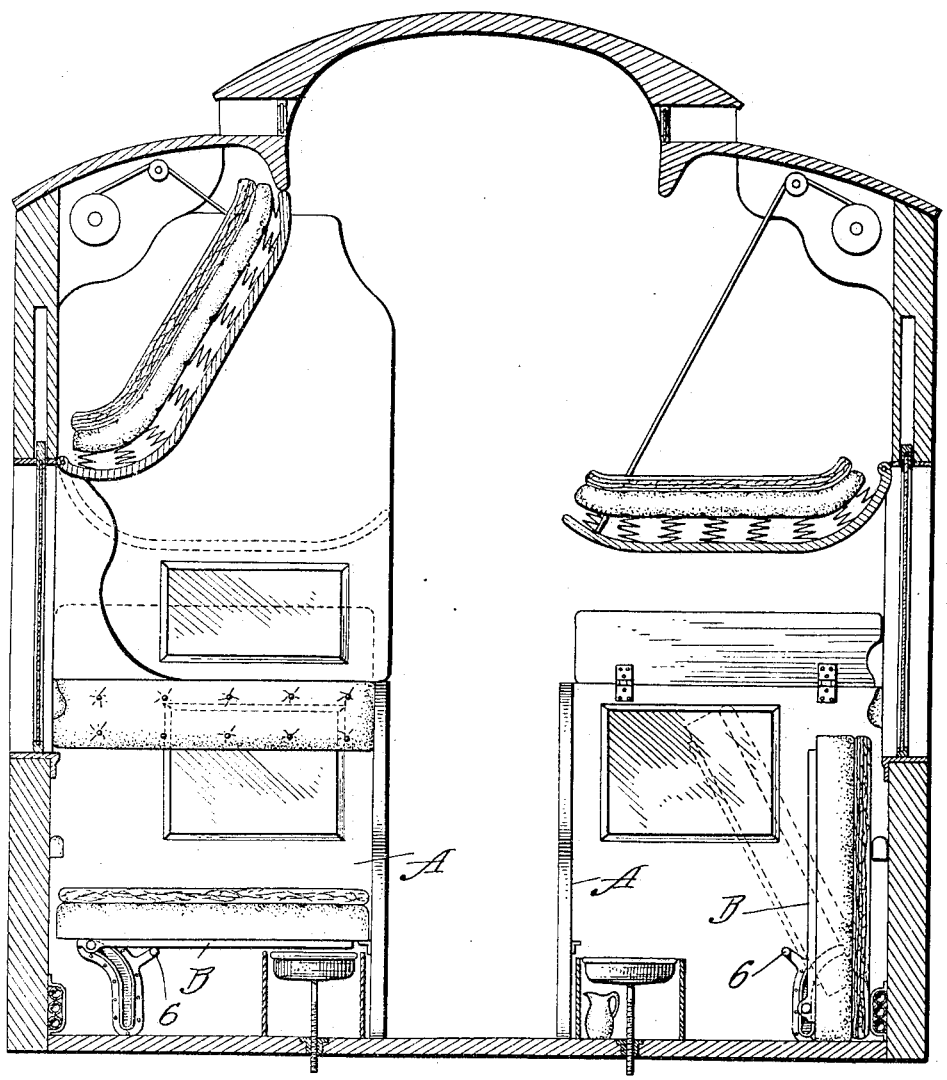

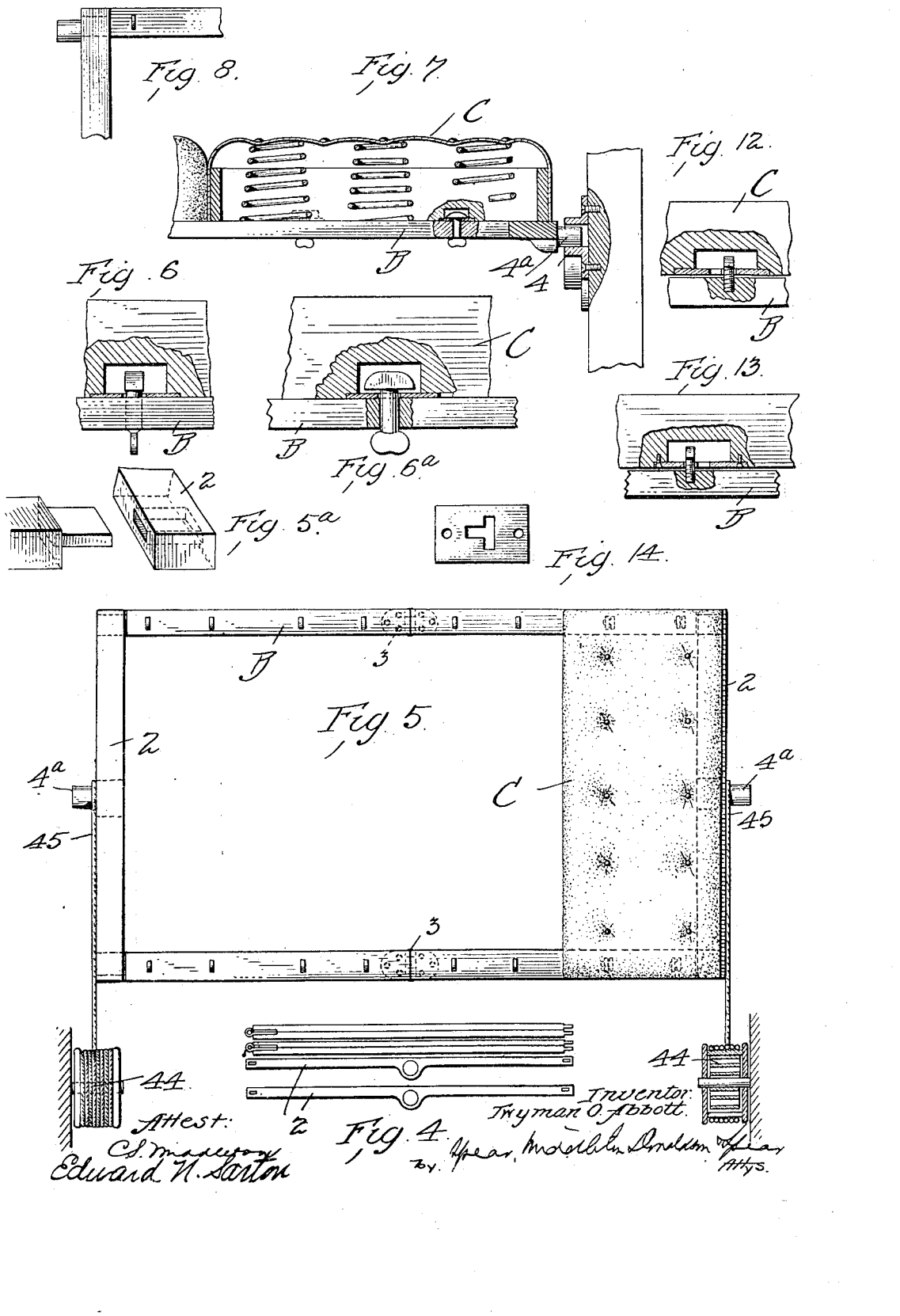

UNITED STATES PATENT OFFICE.

TWYMAN O. ABBOTT, OF SEATTLE, WASHINGTON.

SLEEPING-CAR.

No. 819,196.      Specification of Letters Patent.      Patented May 1, 1906.

Application filed January 17, 1906. Serial No. 296,545.

*To all whom it may concern:*

Be it known that I, TWYMAN O. ABBOTT, a citizen of the United States, residing at Seattle, Washington, have invented certain new and useful Improvements in Sleeping-Cars, of which the following is a specification.

My invention relates to sleeping-cars, and is designed mainly for cars of the Pullman class embodying the general plan of the United States Patents to Woodruff of 1856. These cars embody such material advantages that they have continued in general use notwithstanding the appearance of many other types; but their use is attended by grievous inconveniences familiar to most travelers. As at the present time and hitherto constructed the bed can be removed to clear the space between the seats only after the occupant has left it and then only by the porter readjusting the whole structure to the day form of seats. There is no convenience whatever for toilet, also no space in which to sit, stand, or dress, excepting in the narrow main passage exposed to view and to the buffetings of porters and of the other passengers.

The primary object of my invention is to avoid these objectionable features of travel in Pullman and other sleeping-cars by providing for the temporary and easy removal of the bed or part thereof, to uncover or leave clear the whole or part of the space between the fixed seat-frames, so that the passenger may get his feet upon the floor without projecting them into the public highway of the aisle. This removal of the bed from the space between the seat-frames may be effected by sidewise movement and preferably by tipping the bed or a part thereof, and this may be done temporarily and by the passenger or by the porter and by a single movement.

An important feature of my said invention consists in the adhering in the main to the existing construction.

Accessories to my said main feature and details of construction are described hereinafter and illustrated in the drawings annexed to this specification and forming a part thereof.

In the drawings, Figure 1 represents an interior side elevation of two sections of my improved sleeping-car. Figs. 2 and 3 show vertical cross-sections of the car. Figs. 4 to 14, inclusive, and Figs. 5ª and 6ª illustrate details of construction hereinafter described.

It will be observed in the drawings that the main features of the common Pullman sleeping-cars are retained. The seats A A, arranged in pairs facing each other and their cushions movable and adapted by day to form the seats and backs and by night to form the bed, are substantially the same as in the cars now in use; but instead of the bridge-piece or removable bars extending between the seat-frames or other devices now in use in order to support the cushion forming the middle part of the bed over the space between the seats I provide a light, thin, movable frame, which extends under the whole bed or a sufficient part thereof, by means of which frame the middle parts of the bed are supported over the space between the seats and by which also the whole, or a sufficient part of the whole, may be lifted and temporarily moved aside. This frame (marked B and shown in place in Figs. 1, 2, and 3 and detached in Fig. 5) is made light and strong and preferably collapsible by folding or displacement of its parts. As shown in Fig. 5, it may be collapsed by removing from the side pieces the interlocked end pieces 2 or by folding the entire frame upon itself on the hinges 3.

The frame is fitted removably in the seat-space and, as shown, covers the seat-frames and the space between, resting upon the frames and other supports in such manner that the frame may be tilted sidewise or may be removed.

The particular form of support is shown more clearly in Figs. 1, 3, and 5. The cross-bar 2 at each end is provided with a pivot or trunnion 4ª, Fig. 5, projecting from the central part of the bar in the place of the frame and having a bearing on the framework or some solid support upon the car-floor. As shown in Fig. 2, these bearings are in a solidly-secured slotted piece, as indicated at 4, as shown in Fig. 7. The slot extends from one side to the center, where it turns downward, forming a pocket in which the trunnion rests and is held when the frame is turned down in normal position as illustrated in Fig. 2. Thus supported at both ends it is apparent that the frame may be turned from its normal or horizontal position to that of a vertical plane, as shown on the right of Fig. 2, the frame B, with the cushion C thereon, being also moved sidewise to the wall of the car, whereby the larger part of the seats and of the space between the seats is uncovered.

In order to lessen the effort required to move the bed to the wall, I provide coiled springs and wire cords, such as those now used to relieve the strain of the upper berths.

These springs are shown at 44 and the ends at 45, Fig. 5, connected to the bed-supporting frame at or near the trunnion, but may be connected at any convenient point.

It will be understood that in putting the parts in order the cushions are removed, as in the present method of making of the bed in a Pullman sleeper. Then the frame is put in place and the cushions laid thereon, and thus the bed is made. In order to remove the bed temporarily, as for the purpose of dressing, the frame supporting the cushions and bed, clothing is tipped and moved to the wall, as illustrated in Figs. 2 and 3. When in normal position, the frame is supported on one side by the trunnion and on the other by brackets 5. It may be removed from engagement with the slots by collapsing the frame or in any convenient way. The bed is in this position the same as the ordinary sleeping-car berth; but in the morning the occupant or the porter at his call may lift the whole bed, resting on the frame, which turns on the trunnions, and by means of their slotted bearing the whole may be moved sidewise to the wall of the car, leaving the greater part of the floor-space clear. These positions are shown on the right-hand side of Figs. 2 and 3. In Fig. 3, the pivot being near the back side, the bed is lifted and drops and may be returned to normal position by pressing it down on a bracket 6 on the slot-piece, which serves as a fulcrum for the return of the bed from its temporary vertical position. In this form the slot is vertical and the trunnions are near the side of the frame instead of the center. The bearing for the trunnion is in the curved end of the slot, as before. With either form the space is uncovered, so that the occupant may have floor-space within the limits of his berth. Although the bed with its supporting-frame is moved aside, it is easy to provide a temporary seat underneath in the space below the bed, such as that shown in Fig. 1$^a$, where is shown a seat 38, vertically adjustable on a screw-standard. This is shown merely as a sample, for other forms will readily suggest themselves. Sitting upon this (even if not able to stand quite upright) the accommodations superior to those now offered will be apparent to all accustomed to travel in sleeping-cars; but the main idea of uncovering the floor-space between the seats affords opportunity for other conveniences. The space under the opposite seat may be utilized for lavatory purposes and may be provided with basin and pitcher in a simple form or with permanent pipes and fixtures for water supply and escape, as in the regular car-lavatories. I have shown in Fig. 1 a bowl or basin 39, vertically adjustable, like the seat 38, and space for a pitcher 40. The seat 38 may also be in the form of a urinal or bowl for other toilet purposes and have its vertically-adjustable standard tubular and arranged to discharge outside of the car. The standard may be threaded, as shown, or of telescopic form. I have devised also permanently-fixed basins and water-pipes, as shown in Fig. 2, in which 39$^a$ represents the basin, like that shown at 39 in Fig. 1, and with fixed hot and cold water supply pipes 41 41, having pivoted spigots, as shown in Fig. 2$^a$. The basins may also be mounted on the vertically-adjustable standards.

Mirrors 46 47 may be set at both ends of the berth-spaces, as shown in Figs. 2 and 3, 46 on the back of the seat behind the upholstering and 47 in the removable division-walls.

The construction described affords under all conditions ample sitting room within the berth when the bed has been moved aside and converts the lower berth into a dressing-room, the full advantage of which the passenger may acquire by securing also the upper berth, in which case he has a private dressing-room ample for car purposes. For many persons the space will be ample, even when the upper berth is let down. I have, however, provided for increased head-space by means of a supplemental floor, as shown in Fig. 2. This floor (marked 50 in the drawings) may extend underneath the berth-section of the car and need not extend to the outer sides. It gives storage room under the main floor, divided by the central wall 51 into two compartments, adapted to secure the small baggage. Access to it by means of a trap-door 52, located in the space between the seats, which when uncovered leaves standing room on the supplemental floor in the part uncovered. The trap-door is turned back and rests against the upturned bed. The plumbing is extended down through this supplemental chamber, as shown in Fig. 2.

While the construction above described converts the lower berth into a comfortable and private dressing-room, increased height of this room may be had by some elevating of the upper berth. The only change, however, which I have made in this is in the manner of hinging the upper berth. I have pivoted this berth on brackets 54, having slots 55 inclined toward the wall of the car, and from an inspection of Fig. 2 it will be seen that the upper berth 56 when put up rests with its pivots in the lower part of the slots and assumes its ordinary closed position, but that when lowered the pivots are in the higher part of the slot, and the berth is therefore raised above the position of the structure now in use. The edge moves on rollers 54$^a$.

Some details of construction of relatively less importance and which may be greatly changed without difficulty are shown in Figs. 4 to 11, inclusive. Fig. 5 shows the pivoted frame hinged to fold upon itself for storage, as illustrated in Fig. 4. The side pieces 1 are joined to the end pieces 2 by tenon-and-mortise joints, as shown in detail 5ª, so that they can be taken apart readily. Fig. 7 shows a part of the bed in place, partly in longitudinal section, the cushions being detachably held to the frame by means of buttons. (Shown more clearly in the detail figures.)

While I have described the frame as extending under the entire length of the bed, I do not restrict myself to this, as the removable frame may be less than the entire length and still serve to support the whole of the bed-cushions.

Figure 9:
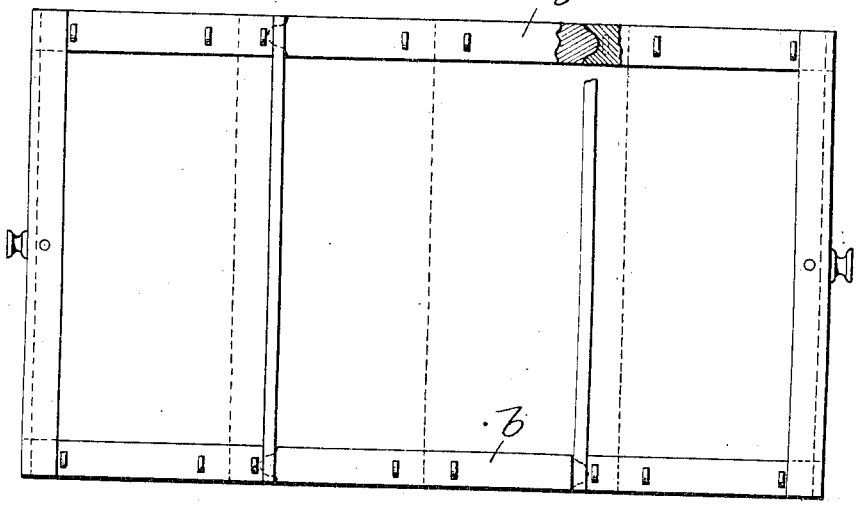
Figure 10:
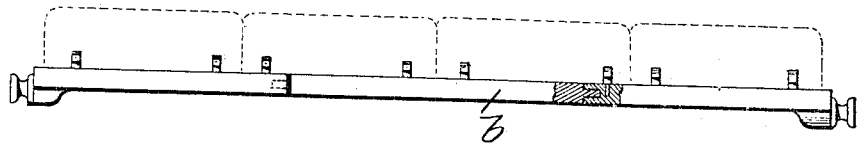
Figure 11:
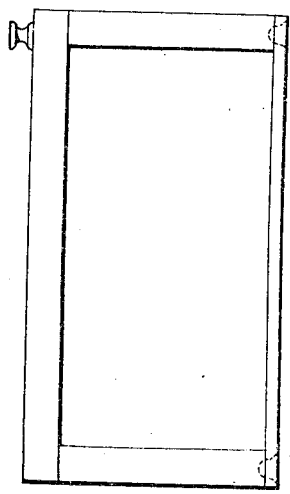

The frame may be made as shown in Fig. 9, in which the central part of the frame is composed of side bars, (indicated at b b,) and these are separately removable. The bars are formed with tenons, as shown in Fig. 10, and fit in mortises in the end frames. One of these mortises for each bar is provided with an entering-slot, so that one end of the bar may be entered first and the other swung into its place. In this form those parts of the frame coterminous with the ordinary seat-frame need not be removable and only the interior parts, but when the interior parts are in place the whole frame may be swung up, as hereinbefore explained. The parts which remain under the seat are illustrated in Fig. 11, which shows one end, the other (omitted) being identical therewith.

Figs. 6, 6ª, 12, 13, and 14 illustrate devices of well-known form for locking the cushions removably to the frame.

I claim as my invention and substantially as described—

1. In a sleeping-car having fixed seats arranged in pairs facing each other and forming a section for a bed, a frame fitted to rest on said seats, to cover the space between the seats, and to support the cushions, and also adapted to be removed to uncover the said space.

2. In a sleeping-car having fixed seats arranged in pairs facing each other and forming a section for a bed, a frame fitted to rest on said seats, to cover the space between the seats and to support the cushions, and also adapted to be turned upon its edge against the side of the car.

3. In combination, with the seats arranged to face each other, and with the cushions therefor, a frame extending over said seats and over the intermediate space, and to support the bed-forming cushions, said frame being arranged to turn on bearings and to be upturned toward the side of the car.

4. In combination with the seats arranged to face each other, and with the cushions therefor, a frame extending over said seats and over the intermediate space and to support the bed-forming cushions, said frame being arranged to turn on trunnions movable in slots.

5. In combination with the seats arranged to face each other, and with the cushions therefor, a frame extending over said seats and over the intermediate space and to support the bed-forming cushions, said frame being arranged to turn on trunnions movable in slots and provided with springs and cords to assist the movement.

6. In a sleeping-car having fixed seats arranged in pairs and facing each other, and movable cushions for said seats adapted to form the bed, a bed-supporting frame adapted to be moved to uncover the space between the seats, in combination with a supplemental floor, and a trap-door therefor in said space.

7. In a sleeping-car having seats arranged in pairs and facing each other, and movable cushions for said seats, adapted to form the bed, a bed-supporting frame adapted to be moved to uncover the space between the seats in combination with an upper berth pivoted to rise on its bearings when swung downward.

8. In a sleeping-car having fixed seats arranged in pairs and facing each other, and movable cushions for said seats, adapted to form the bed, a bed-supporting frame adapted to be moved to uncover the space between the seats, in combination with toilet bowls or basins, and water-supply pipes, located in the space beneath the seats, said bowls or basins being uncovered by the removal of the frame.

9. In a sleeping-car having seats arranged in pairs and facing each other, and movable cushions for said seats, adapted to form the bed, a bed-supporting frame adapted to be moved to uncover the space between the seats and an upper berth vertically movable on its pivots.

In testimony whereof I affix my signature in presence of two witnesses.

TWYMAN O. ABBOTT.

Witnesses:
C. S. MIDDLETON,
EDWARD N. SARTON.